United States Patent [19]
Thompson et al.

[11] 3,986,446
[45] Oct. 19, 1976

[54] DOUGH PROOFING APPARATUS

[75] Inventors: Daniel T. Thompson, Pacific Palisades; Thomas A. Rowland, Los Angeles, both of Calif.

[73] Assignees: Daniel T. Thompson; Ada Thompson, both of Pacific Palisades, Calif.

[22] Filed: Jan. 30, 1975

[21] Appl. No.: 545,583

[52] U.S. Cl. .................................. 99/485; 99/478; 198/801; 198/715; 198/712; 198/531
[51] Int. Cl.² ................... A23L 00/00; B65G 17/00
[58] Field of Search ............ 198/20 R, 26, 37, 131, 198/153–158, 31 R, 32, 129, 236–238, 240, 145, 187, 148; 214/67 S; 99/443 C, 477, 478, 467, 485; 425/364 B

[56] References Cited
UNITED STATES PATENTS

| | | | |
|---|---|---|---|
| 1,899,246 | 2/1933 | Schiff | 198/153 |
| 2,237,659 | 4/1941 | Edwards | 198/26 |
| 2,941,655 | 6/1960 | Wells | 198/154 |
| 2,988,199 | 6/1961 | Pinkham | 198/238 |
| 3,146,730 | 9/1964 | White | 198/155 |
| 3,347,351 | 10/1967 | Mencacci et al. | 198/131 |
| 3,783,994 | 1/1974 | Tomalty | 198/131 |
| 3,878,932 | 4/1975 | Reimers | 198/26 |
| 3,880,069 | 4/1975 | Moline | 99/467 |

Primary Examiner—Evon C. Blunk
Assistant Examiner—Joseph E. Valenza
Attorney, Agent, or Firm—Poms, Smith, Lande & Glenny

[57] ABSTRACT

A dough proofing apparatus is for use in association with a dough forming apparatus having a dough piece receiving means which receives preformed dough pieces from a dough dividing machine and directs them toward a toroid forming apparatus wherein the proofing apparatus includes dough conveyance means for receiving and conveying dough pieces in a proofing mode of travel through a closed loop path of travel of the conveyor belt between generally adjacent dough entry and dough exit locations on the toroid forming apparatus. The conveyance belt is passed over vertically spaced pulleys with dough pieces retained thereon by adjacent dough support means on the conveyance belt which cooperate to form open-ended cage-like dough retaining receptacles for dough pieces as they travel on the conveyance means over and about the vertically spaced pulleys. In an alternative embodiment thereof, the conveyance means has its vertically spaced pulleys mounted on axes at various angles to one another in order to provide a change in axis of rotation for the conveyance belt of 180° as it goes about the closed loop path of travel to reverse the inner and outer sides of the conveyance belt once per complete revolution. Alternative forms of dough receptacles are also disclosed.

14 Claims, 23 Drawing Figures

DOUGH PROOFING APPARATUS

BACKGROUND OF THE INVENTION

This invention relates in general to dough proofing apparatus for proofing the relatively tough, elastic dough, required in making bagels after a preforming operation, as in a dough divider apparatus and prior to a finished forming operation, as in a toroid forming apparatus. More particularly, the present invention relates to such a dough proofing apparatus which is so provided that it is easily and operably integratable with current bagel dough handling apparatus.

Various types of dough forming apparatus have been developed heretofore for forming dough into desired configurations prior to baking thereof. In particular, toroid forming apparatus have been developed for handling a relatively tough, elastic, tacky dough employed in making bagels as in the prior Meyer Thompson U.S. Pat. No. 3,433,182 and my U.S. Pat. No. 3,792,940, by way of example. In the toroid forming apparatus of these patents, a strip of dough is received at a dough receiving location and formed by forming sleeve assemblies which roll the dough strips about a stationary mandrel. Means are disclosed in each of these patents for preforming dough pieces into strip form which are more readily formable into the desired finished toroidal configuration by the associated toroid forming apparatus.

In the dough forming operations of these prior machines, the bagel dough is first preformed into strip configuration and then formed into toroidal configuration. This working of the dough can have a tendency to produce a more dense, tough end product than is preferably desirable. It has been common practice in the past to proof, i.e., allow the dough to stand for a while while it expands, the dough toroids thus formed before baking in order to dissipate the effects of the working of the dough due to such forming operations. I have found that it would be desirable to provide for proofing of the dough between the preliminary forming operations and the toroid forming operations of the foregoing apparatus in order to minimize the aforementioned adverse effects of working of the dough during the various forming operations.

SUMMARY OF THE INVENTION

Therefore, it is the primary object of the present invention to disclose and provide a dough proofing apparatus for use in association with a dough forming apparatus whereby preformed dough pieces may be placed in a proofing condition to minimize the effects of the preforming thereof preparatory to their being delivered into the dough forming apparatus for final forming into a final configuration such as toroidal configuration employed in making bagels.

Other and additional objects of the present invention are to disclose and provide such a dough proofing apparatus wherein the apparatus is easily incorporated into use in association with the pre-existing dough preforming and final forming apparatus in general use; where the dough piece entry and dough piece exit locations are generally adjacent one another to facilitate interposing such proofing apparatus between a dough receiving station and a dough forming station on a dough forming apparatus; where a continuous closed loop path of travel may be provided for the dough pieces during their proofing operation which may be of variable extent; and wherein a maximum number of dough pieces may be mounted upon a dough piece conveyor and conveyed through a maximum travel therefore which is longer than the length of one revolution of the conveyor belt about its path of travel.

Generally stated, the dough proofing apparatus of the present invention includes the provision of a dough conveyance means for receiving and conveying dough pieces in a closed loop path of travel between generally adjacent entry and exit locations together with means for mounting such dough conveyance means relative to a dough forming apparatus such that the entry and exit locations are interposed between a dough piece receiving means and a dough forming means on the dough forming apparatus. More specifically, the dough proofing apparatus of the present invention includes such dough conveyance means, and mounting means, wherein there are at least two or more vertically spaced pulleys with the conveyance means including a belt run about such pulleys to provide an essentially vertical closed loop path of travel for the dough pieces above the dough forming apparatus. The dough conveyance means include a plurality of dough supports provided upon the conveyance belt, each such support including a base means with a laterally extending portion having a cross end piece to constrain dough pieces thereon as the supports go about the closed loop path determined by the travel of the conveyance belt about the pulleys. Means are provided for controlling the feed of dough pieces onto the conveyance means and in an alternative exemplary embodiment, the conveyance means is provided with dough supports on both sides thereof and is reversed 180°, inside out, during its closed loop path of travel to cause a picked up dough piece to travel twice about the closed loop path before being discharged at the exit location.

These and other objects of this invention, together with a better understanding thereof, will become apparent to those skilled in the art from a consideration of the following detailed description of a preferred and two exemplary embodiments of the invention in dough proofing apparatus. Reference will be made to the appended sheets of drawings in which like numerals refer to like parts.

DETAILED DESCRIPTION OF THE PREFERRED EXEMPLARY EMBODIMENT

The preferred exemplary embodiment of dough proofing apparatus, according to the present invention, is illustrated generally at 40 in FIG. 2 in association with a dough forming apparatus indicated generally at 20 and, as will be explained hereinafter, is adapted to receive a strip of dough, indicated generally at 10, from the dough divider 11 and deliver it, after a predetermined proofing time, into the dough forming apparatus. While a strip of dough, indicated generally at 10, preferably employed in making bagels, is illustrated in association with the within preferred exemplary embodiment of dough proofing apparatus, it should be understood that other configurations of dough bodies and other types of dough may be employed with the present apparatus, although this exemplary embodiment is particularly suited for proofing the strips of dough normally employed in forming bagels.

Figures 1, 2, 5:
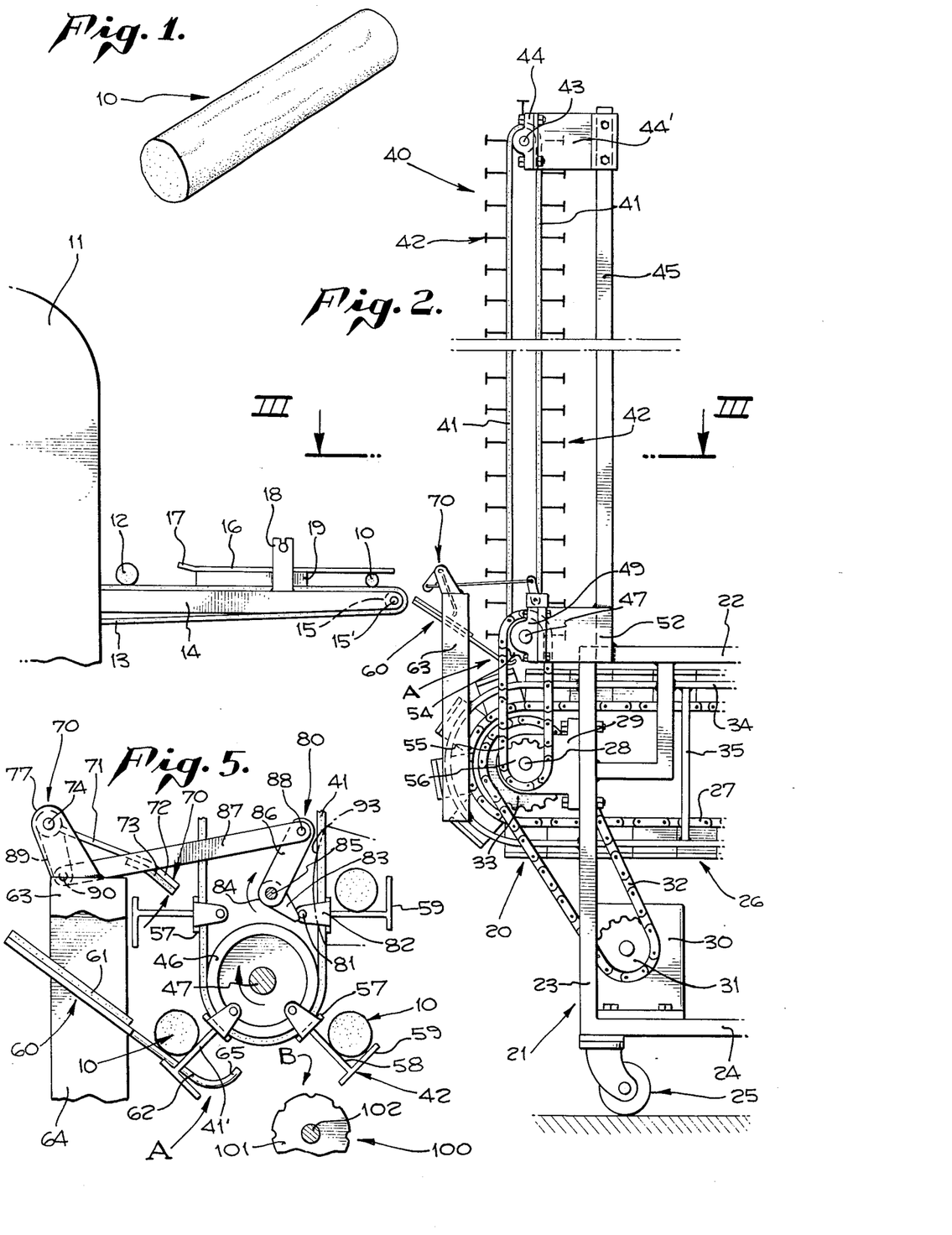
FIG. 1 is a perspective view of a rolled strip of relatively tough, elastic dough, suitable for use in making bagels, in its condition after leaving a dough dividing and strip forming apparatus, ready for proofing, prior to delivery to a toroid forming apparatus.
FIG. 2 is a side elevational view of a dough dividing and strip forming apparatus positioned adjacent to an otherwise conventional toroid forming apparatus to which a dough proofing apparatus, according to the present invention, is assembled for receiving strips of dough, as shown in FIG. 1, from the strip forming apparatus, proofing the same and delivering the same to the toroid forming apparatus.
FIG. 5 is a detail view as in FIG. 4 showing the dough strip received and being picked up by the dough proofing apparatus.
Figure 3:
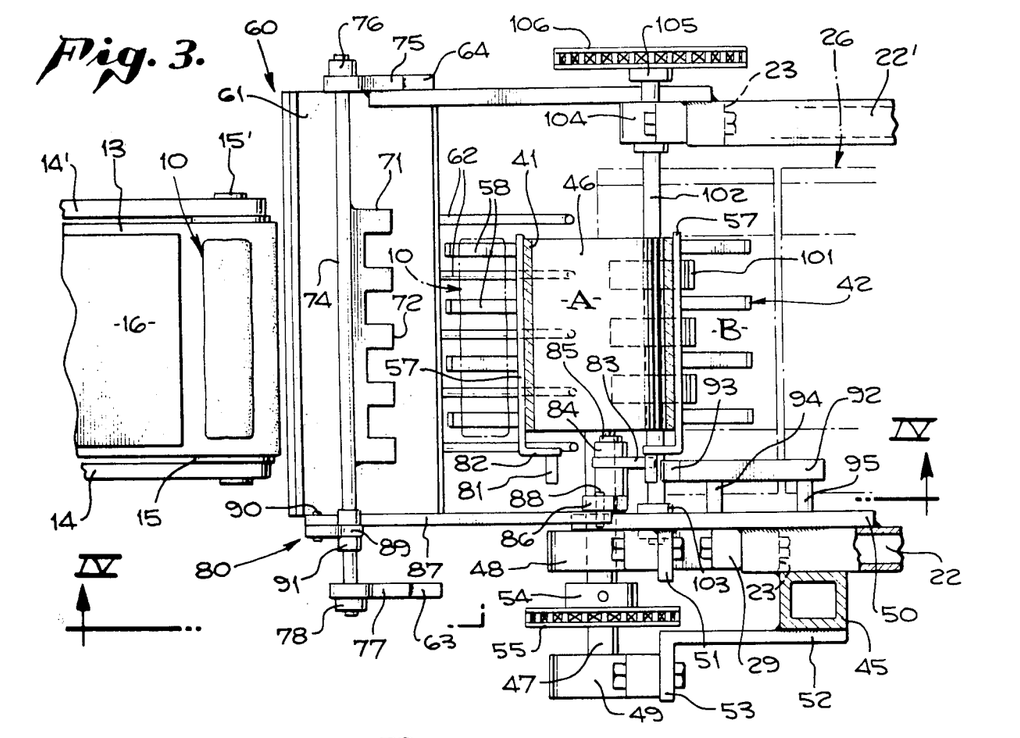
FIG. 3 is a plane view, partially in section, of the apparatus of FIG. 2 taken therein along the plane III-—III.

Referring to FIG. 2, a conventional dough divider apparatus 11, as known in the art, receives dough in batch form and delivers it in piece or ball form, as dough ball 12, onto an associated conveyor belt 13. Conveyor belt 13 is suspended in conventional manner on a support frame including a pair of spaced cantilevered support arms 14 and 14', as best seen in FIG. 3, with a support plate (not shown) being suspended between the arms and beneath the top lay of the conveyor belt 13. A pulley 15 is journalled by its pulley shaft 15' in the support arms 14 and 14' to facilitate travel of conveyor belt 13 about the support to move the dough balls or pieces, as ball 12, beneath a strip forming means associated therewith.

The strip forming means in the preferred exemplary embodiment, as seen in FIGS. 2 and 3, includes a pressure plate 16, having an upturned entry lip 17, suspended over the upper lay of conveyor belt 13 by a pair of standards or supports, as standard 18 in FIG. 2. A pair of side walls, as wall 19 in FIG. 2, are also provided in order to roll dough ball 12 into a generally cylindrical strip configuration between the spaced side walls, upper lay of conveyor 13 and overhead pressure plate 16 into the configuration of the dough strip indicated generally at 10 in FIG. 1. The dough strip forming apparatus thus far explained is well known in the art and is illustrated here for purposes of showing a conventional manner of delivery of a dough strip, suitable for forming bagels, toward a toroid forming apparatus. As noted above, the dough proofing apparatus of this preferred exemplary embodiment, as will be more fully explained hereinafter, is particularly suitable for receiving and proofing dough strips of this configuration.

Toroid forming apparatus is illustrated generally at 20 in the preferred exemplary embodiment in FIG. 2. The exemplary toroid forming apparatus, for purposes of the present invention, may be considered to be well known in the art prior to the instant invention and may be constructed in accordance with the disclosures to toroid forming apparatus of prior U.S. Pat. Nos. 3,433,182 and 3,792,940. Reference is hereby made to the disclosures of said patents for a complete understanding of the construction and mode of operation of the toroid forming means, which in general comprises the provision of a plurality of articulated sleeve members which roll the dough strip about a stationary mandrel to form dough strips into a toroid configuration. In the present exemplary embodiment, such toroid forming apparatus comprises a main frame, indicated generally at 21, having top rails 22, 22', corner posts, as post 23, bottom rails, as rail 24, and a plurality of support casters, as caster 25. The forming sleeve assemblies 26 are mounted upon a mounting chain 27 which is run about a drive sprocket (not shown) mounted upon a main drive shaft 28. Drive shaft 28 is mounted in a pair of spaced journal blocks, supported to the main frame, as journal block 29 is seen in FIG. 2 mounted to corner post 23.

Motor 30 is supported upon the main frame, indicated generally at 21, and is adapted by its drive sprocket 31 to drive chain 32 run about sprocket 33. Sprocket 33 is fixed upon main drive shaft 28 to turn the latter, and its associated mechanisms, in response to operation of motor 30. The drive for the plurality of articulated forming sleeve assemblies, each sleeve comprising a pair of cup halves hinged together, comes from the motor drive of shaft 28, thus far described. As will be more readily apparent from a review of the prior patent noted above, the forming sleeve cup halves are opened and closed as they move about the apparatus by a pair of spaced guide rails, guide rail 34 being seen in FIG. 2. As the sleeve assembly cup halves come around their drive sprocket in a clockwise rotation in FIG. 2, they are opened by the spaced guide rails in order to receive a dough strip in the area of the apparatus generally above and slightly to the right of drive shaft 28 and are thereafter closed by the guide rails to roll the received dough strips about the associated stationary mandrel. These guide rails are supported from the the dough forming apparatus frame and include suitable structural bracing members, as brace 35 in FIG. 2. As will be discussed hereinafter, these spaced guide rails provide a support function in the exemplary embodiment for a portion of the dough transfer and guide means of the exemplary dough proofing apparatus of the present invention.

Dough piece receiving means for directing a received dough piece from the dough divider 11 and its associated conveyor belt 13 and directing it into the opened toroid forming sleeve assemblies of the toroid forming apparatus is provided in the preferred exemplary embodiment. Such means, indicated generally at 60 in FIGS. 2 through 5, includes the provision of a ramp 61, having a plurality of depending ramp fingers 62, supported between side support brackets 63 and 64. Brackets 63 and 64 may be mounted to the toroid forming apparatus by welding, or other suitable fastening means, to the aforedescribed guide rails, as bracket 63 is mounted to guide rail 34 in FIG. 2. The connection between ramp 61 and brackets 63 and 64 may also be a welded or other fastener type connection, the only requirement being that the ramp 61 be suspended between the support members and inclined from the discharge end of conveyor 13 downwardly toward the area or location at the toroid forming apparatus, as seen in FIG. 2, where the sleeve assemblies are opened to receive a dough strip preparatory to rolling it about the associated mandrel. The depending ramp fingers 62, are provided in accordance with the present invention, with upturned ends 65 in order to position the dough strips in a pick up location for the exemplary dough proofing apparatus rather than delivering such strips directly into the toroid forming apparatus as will be more thoroughly explained in association with the description of FIGS. 4 and 5 and the exemplary dough proofing apparatus indicated generally at 40.

As particularly contemplated within the present invention, dough proofing apparatus is associated between the exemplary dough strip forming apparatus and toroid forming apparatus, thus far explained, for receiving and proofing dough strips after such initial strip forming and prior to said toroid forming. In the preferred exemplary embodiment, such proofing apparatus is indicated generally at 40 and includes dough conveyance means for receiving and conveying dough pieces in a closed loop path of travel between generally adjacent entry and exit locations. As seen in FIGS. 2 and 5, such entry location for dough pieces, the exemplary dough strip 10, is at the upturned end of ramp fingers 62 at the location indicated generally at A. The exit location for the dough conveyance means is at the location indicated generally by B where the proofed dough strips are delivered into the toroid forming apparatus. In this preferred exemplary embodiment, the closed loop path of travel between such generally adjacent entry and exit locations, at A and B, is generally vertical, although as will be seen from the following description of alternative exemplary embodiments, variations in the configuration of the closed path of travel may be made within the scope of the present invention.

The exemplary dough conveyance means includes an endless conveyance belt 41 mounting dough strip supports, indicated generally at 42, and run vertically about a top pulley 43 rotatably cantilevered from its journal supports 44 and 44' fixed upon vertical standard 45 and a bottom pulley 46 (FIG. 3) rotatably mounted by its pulley shaft 47 cantilevered from its journal supports 48 and 49. Journal support 48 is secured to a support plate 50, on the toroid forming apparatus, via a laterally extended flange 51 which may be welded to plate 50 in conventional manner. Also as best seen in FIG. 3, support journal 49 may be bolted in conventional manner to standard 45, the latter being welded or otherwise securely fixed to the toroid forming apparatus top rail 22.

Conveyance belt 41 is driven via its bottom pulley 46 through the provision of a drive sprocket 54 secured by its hub to shaft 47 in conventional manner, sprocket 54 being driven by drive chain 55 run about a lower drive sprocket 56 (FIG. 2) fixed upon main drive shaft 28. From the foregoing, it can be seen that in operation of the motor 30 to drive the associated toroid forming assemblies, power drive may be taken off of the main drive shaft 28 through chain 55 for running the conveyance belt in a vertical closed loop path of travel about the upper and lower pulleys 43 and 46, respectively.

Figure 4:
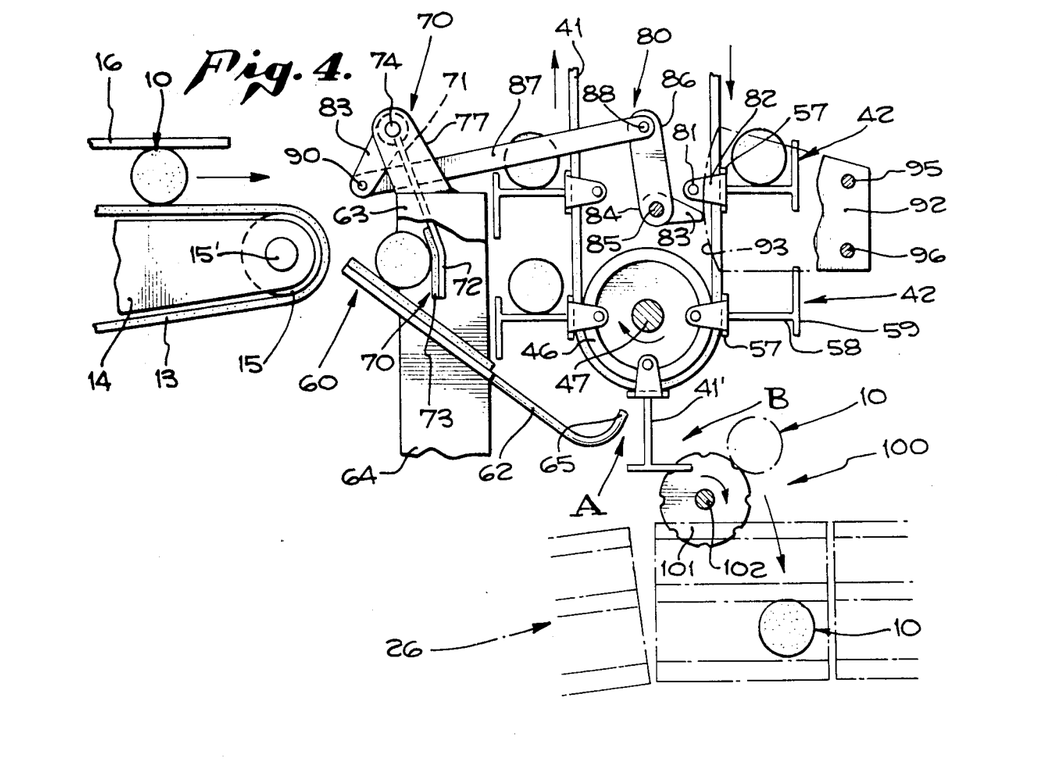
FIG. 4 is a side detail elevational view of a portion of the dough proofing apparatus of FIGS. 2 and 3, taken in FIG. 3 along the plane IV—Iv, showing a strip of dough as in FIG. 1 being held by stop means preparatory to its being released for pick up by the dough proofing apparatus.

As is further contemplated within the present invention, the dough piece support means, indicated generally at 42, on the conveyance belt 41 are provided in a manner for retaining a dough piece betwen adjacent supports on running of the belt, supports and dough pieces or strips over and about the upper pulley of the preferred exemplary embodiment of vertically oriented closed loop path of travel for conveyance belt 41. Such dough piece support means, in the exemplary embodiment, and as best seen in FIGS. 3, 4 and 5, each include a dough support base 57 secured to the conveyance belt 41 with a plurality of spaced, outwardly extending, fingers 58 on each base. Each of the fingers 58 has a vertical end extension 59 to constrain a dough piece, such as the dough strip indicated generally at 10, upon the associated finger support. Through the provision of such fingered base supports, a dough piece or strip resting upon ramp fingers 62 at the entry location indicated generally at A may be readily picked up by the dough support fingers 58 as they pass between ramp fingers 62 as best seen in FIG. 3.

The vertical end extensions 59 on base support fingers 58 extend above and below their associated fingers to provide an open-ended cage-like enclosure for each of the dough pieces or strips as they travel vertically on conveyance belt 41. As the dough supports 41 swing over the top pulley 43, as seen in FIG. 2, the supported dough pieces or strips roll from the top of a given support over onto the bottom of a preceding dough support which, on movement about pulley 43, becomes an upper surface on the right-hand lay of the conveyance belt loop. End extensions 59 facilitate retention of the dough strips or pieces on such dough supports as they revolve through said vertical closed loop path.

Control means are provided for controlling the feed of dough strips or pieces from the dough receiving means, indicated generally at 60, and including ramp 61 to the dough proofing apparatus entry location indicated generally at A at the lower end of ramp fingers 62. Such means, in the exemplary embodiment, includes the provision of stop means 71 having a plurality of depending fingers 72 upon which a non-stick covering of low friction type material 73 is provided. Stop means 71 is secured, as by welding, to control shaft 74, as best seen in FIG. 3, which is pivotally supported at one end on journal plate 75, and secured thereto by fastener 76, and at the other end by journal plate 77 with an appropriate end fastener 78. Journal plate 75 and 77 may be mounted to the previously described support plates 64 and 63, respectively, by suitable fastening means such as welding.

The aforedescribed control means, indicated generally at 70, in the exemplary embodiment, is further provided with means for actuating the stop means 71 in response to movement of the dough supports into the entry location, indicated generally at A, to provide a timely release of a dough strip or piece from the stopped or held position of FIG. 4 to the release, pick up position as generally illustrated in FIG. 5. In the exemplary embodiment, such actuating means is indicated generally at 80 and includes, as hereinafter more fully explained, a plurality of pin actuators on the conveyance belt which engage and move a control linkage means for moving stop means 71 to the release position of FIG. 5 as a corresponding dough support approaches the dough receiving station indicated generally at A, as seen in FIG. 4. Specifically, such means includes the provision of actuator pins 81 on flanges 82 of each of the dough support bases 57 as seen in FIGS. 4 and 5. A strike arm 83 is provided as part of a control linkage means to be struck and operated by each of the actuator pins 81 as they pass thereby, as seen from a comparison of FIGS. 4 and 5.

Control linkage means in the exemplary embodiment includes the strike arm 83, aforenoted, which is integrally formed of a sleeve portion 84 (FIG. 3) journalled upon a stud 85 secured to support plate 50. Sleeve 84 also is provided with an integrally formed arm or lever 86 which is pivotally connected to link 87 by pin 88. Link 87 is in turn pivotally connected to lever arm 89 by pin 90, arm 89 being formed integrally of a bushing portion 91 pressfit to shaft 74. From the foregoing, it can be seen when a strike pin 81 engages strike arm 83 and depresses it due to clockwise rotation of conveyor belt 41 in FIG. 4, the aforedescribed control linkage means will move stop means 71 into the release position of FIG. 5 until pin 81 passes strike arm 83, when the control linkage will resume its position of FIG. 4 and stop means 71 will fall to the position of FIG. 4 ready to stop the next delivered dough strip.

In order to assure contact between each of the strike pins 81 as they come into alignment with strike arm 83, a cam plate 92 is positioned in line with strike arm 83 and spaced therefrom a distance less than the thickness of the strike pins 81, assuring contact between each pin 81 and arm 83 as the former passes thereby. As seen in FIGS. 3 and 4, cam plate 92 presents a curved cam face 93 towards the right-hand side of the strike pins 81 as they pass thereby, plate 92 being supported by a plurality of support posts, as post 94, 95 and 96, secured to support plate 50 by conventional means, such as welding.

As seen in FIG. 4, as a dough support 41' approaches the dough entry location indicated generally at A the second succeeding dough support's pin 81 comes into engagement with strike arm 83 to operate the stop means 71 to a released position through the control linkage means aforedescribed. As the released dough piece or strip 10 rolls down ramp 61, the dough support 41 continues in its travel with its associated fingers passing between the ramp fingers 62 to pick up the dough piece or strip 10 and carry it vertically upwardly in a closed loop path of travel over upper pulley 43 and back down toward the release location indicated generally at B. At the release location, release assist means are provided in association with the conveyance means to assist the release of dough pieces or strips from the conveyance means to assure transfer thereof into the adjacent toroid forming sleeve 26 of the associated toroid forming apparatus. Such release means, in the exemplary embodiment, is illustrated at 100 in FIGS. 3, 4 and 5 and includes a plurality of release wheels 101 mounted upon a driven shaft 102 rotatably supported in a front journal 103 and a rear journal 104. Sprocket 105, secured to shaft 102, may be operated by the chain drive 106 off of the main drive shaft 28 in conventional manner. Preferably, wheels 101 are operated at relatively high speed in order to impel the dough strips quickly toward the toroid forming apparatus to assure a prompt discharge thereof from the conveyance means in view of the closeness of the spacing of the entry and exit locations indicated generally at A and B. The construction, and mode of operation of such release wheels may be in conformity to that illustrated and described in prior U.S. Pat. No. 3,580,385.

FIRST ALTERNATIVE EXEMPLARY EMBODIMENT

Referring now to FIGS. 6 through 10, a first alternative exemplary embodiment of dough proofing apparatus, in accordance with the present invention, will be described. While a strip-like dough piece was utilized in association with the dough proofing apparatus of the preferred exemplary embodiment, it is contemplated that other configurations of dough pieces, such as a ball-shaped dough piece, indicated generally at 110 in FIG. 6, may be received and proofed on the proofing apparatus of the present invention. Such ball-shaped dough pieces may be supplied, in known manner, from dough dividing apparatus in tandem, i.e., two at a time, as indicated at 111 and 112 upon a dough receiving means indicated generally at 160. Such dough receiving means may include a twosided ramp, including sides 161 and 162 divided by a center guide 163. Such dough receiving means may be supported upon a toroid forming apparatus in the same manner as the dough receiving or transfer or guide means, indicated generally at 60 in FIG. 2, is supported upon the toroid forming apparatus indicated there at 20. Similarly, a discharge ramp, indicated generally at 200, may be provided with discharge ramp portions 201 and 202 divided by center divider 203 for delivering discharged, proofed, dough pieces to the toroid forming apparatus. Such discharge ramp would be positioned at location B with regard to the toroid forming apparatus of FIG. 2. For purposes of the present explanation, therefore, the entry and exit locations for the alternative exemplary embodiment of toroid proofing apparatus, corresponding to the positions A and B of the prior exemplary embodiment are provided by the lower end of the receiving means ramp and the upper end of the discharge ramp in FIG. 7.

Figures 6, 7, 8:
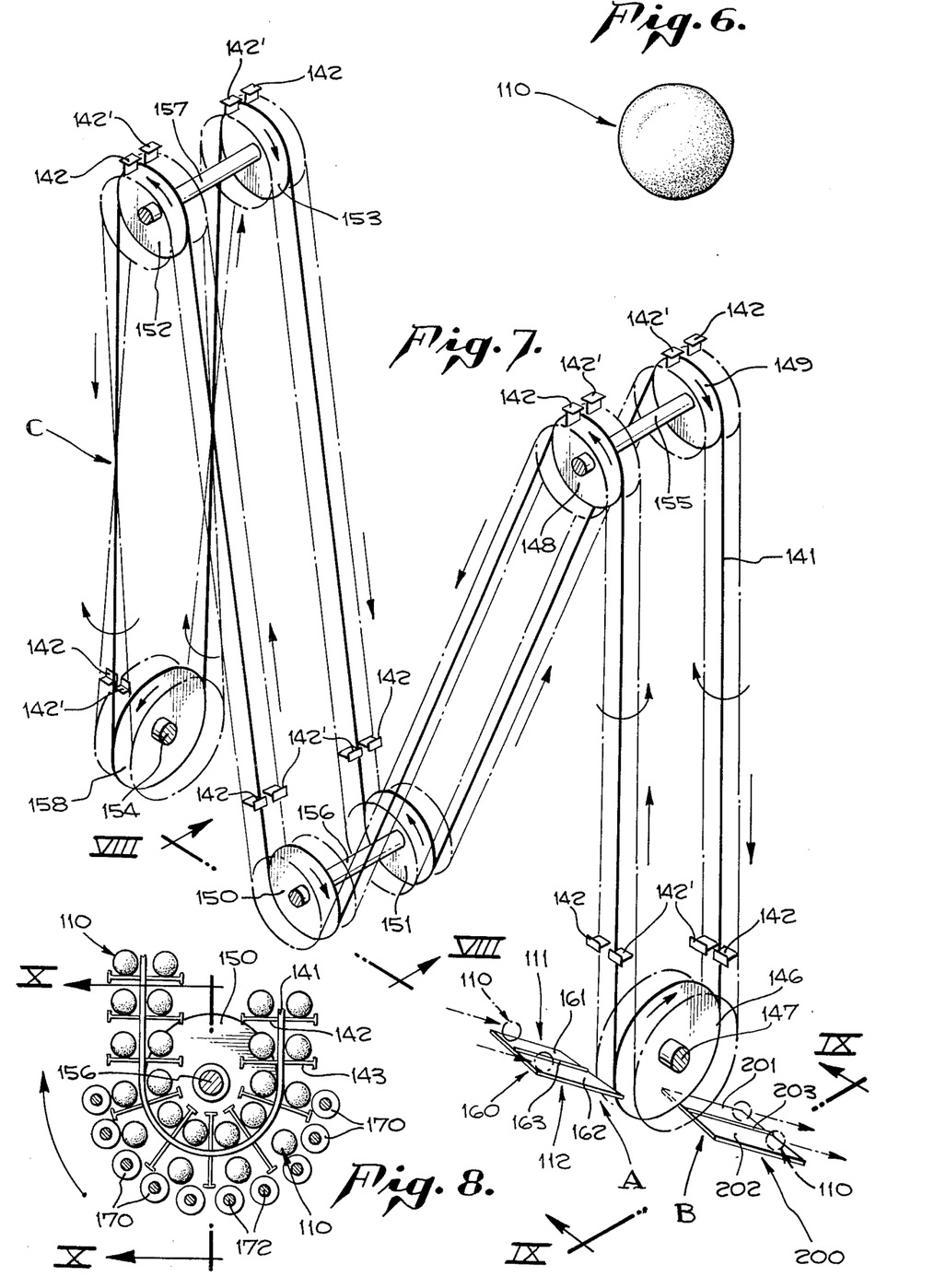
FIG. 6 is a side view of a dough piece, as in FIG. 1, but of generally circular configuration as it might be dispensed from a dough divider apparatus without being rolled into strip form.
FIG. 7 is an alternative exemplary embodiment of dough proofing apparatus according to the present invention which may be associated with the dough divider and toroid forming apparatus of FIG. 2 in place of the preferred exemplary embodiment of dough proofing apparatus illustrated therein, this alternative exemplary embodiment being shown somewhat schematically.
FIG. 8 is a detailed view of a portion of the alternative exemplary embodiment of dough proofing apparatus of FIG. 7 taken therein along the plane VIII—VIII.

In the alternative exemplary embodiment of dough proofing apparatus of FIG. 7, the drive for the conveyance belt, represented schematically at 141, may be put in through shaft 147 upon which a drive pulley 146 is mounted. Pulley 146, and its drive shaft 147 correspond to bottom pulley 46 and its drive shaft 47 of the prior embodiment and may be similarly driven off of the power drive of the associated dough forming apparatus. As is particularly contemplated within the present invention and illustrated in this alternative exemplary embodiment, the closed loop path for the conveyance belt 41 of the prior embodiment and 141 of the present embodiment, may be provided in an extended closed loop manner as illustrated in FIG. 7 with the entry and exit locations A and B, respectively, preferably maintained in close adjacent location as previously described. Toward that end, in the schematic representation of a pulley and conveyor belt system in FIG. 7, a plurality of idler pulleys 148 through 154 are rotatively mounted upon support axle 155 through 158. Axle 155 through 158 may be suspended upon suitable framing or standards associated with the toroid forming apparatus, as in the case of standard 45 in the first embodiment, or on other suitable supports as is convenient.

Figures 9, 10, 11, 12:
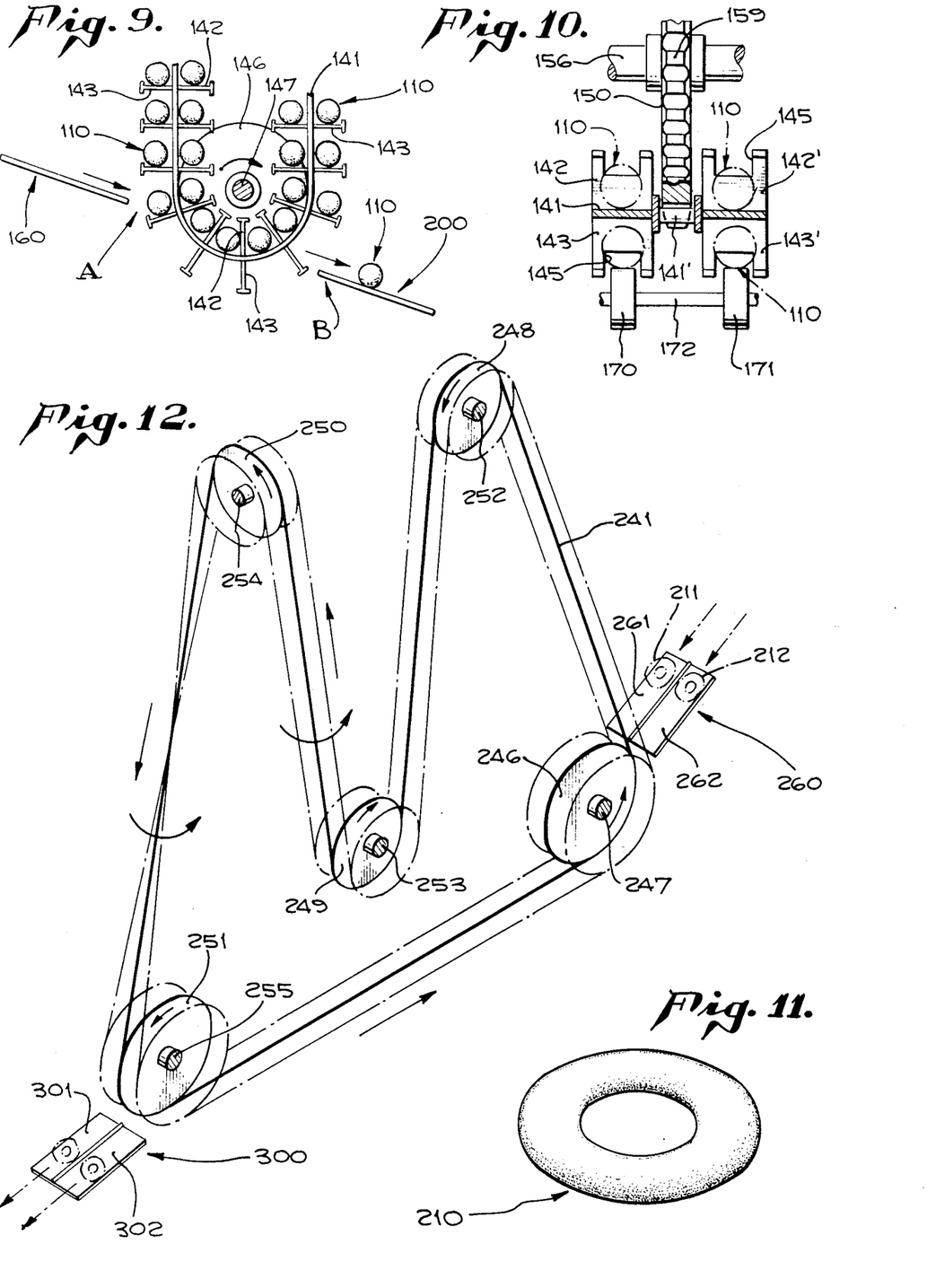
FIG. 9 is a detail view of a portion of the dough proofing apparatus of FIG. 7, showing entry and exit of dough pieces, taken along the plane IX—IX in FIG. 7.
FIG. 10 is a cross sectional view through the conveyance means of the dough proofing apparatus of FIGS. 7 through 9 taken along the plane X—X in FIG. 8.
FIG. 11 is a perspective view of a toroid of dough, which may be formed by the toroid forming apparatus of FIG. 2 or otherwise.
FIG. 12 is a schematic view of a still further alternative, exemplary embodiment of dough proofing apparatus as in the foregoing embodiments, but with a differently configured closed loop path of travel for the conveyance means thereof.

Referring now to the detailed views of FIGS. 8 through 10, each of the pulleys 146 and 148 through 154 are similarly constructed with pulley 150 being illustrated in the detail of FIGS. 8 and 10. Each such pulley, in the alternative exemplary embodiment, is provided with a rather narrow lateral extent, as seen in FIG. 10 with drive teeth 159 formed about the periphery thereof. The alternative exemplary embodiment of conveyance belt 141 is formed with a center drive chain 141', as seen in FIG. 10, which is positively engaged by the drive teeth 159 of the respective sprocket like pulleys.

Dough supports are provided on conveyance belt 141 on opposite sides of the same belt section and on either side of the central drive chain 141' in order to maximize the storage capacity of the alternative exemplary embodiment of conveyance means. As seen in FIG. 10, sets of opposed dough supports 142, 143 and 142', 143' are positioned adjacent each other in generally aligned relationship on opposite sides of the central drive chain 141'. These dough supports are formed with a body portion, as opposed to the fingers of the preceding embodiment, and have cutouts 145 to facilitate passing support rollers 170, 171 rotatably mounted on axle 172. As seen in FIGS. 8 and 10, as the outside dough supports 143 and 143' are carried by the conveyance belt 141 beneath pulley 150, the ball-shaped dough pieces, indicated generally at 110, might fall out of the opened cage-like configuration of adjacent dough supports, due to the curvature about pulley 150, but for the provision of support rollers 170 and 171 for maintaining them between adjacent dough supports until the dough supports are moved back into the more closed cage-like configuration they assume during linear travel along the belt path between pulleys. As seen in FIGS. 8 and 9, the dough pieces on the inner side of conveyance belt 141, on dough supports 142, as belt 141 goes under a pulley are retained between adjacent supports without the need for any additional constraints. In passing over the top of a pulley, the outer or top oriented dough support will act in the manner as described with regard to the passing of dough support 42 over top pulley 43 in the prior embodiment with the inwardly or bottom oriented dough supports being moved toward one another, as the inner supports 142 in FIGS. 8 and 9 do, to support the dough pieces therebetween without the need for additional supports or constraints.

As contemplated within the present invention, the means for mounting the pulleys for the alternative exemplary embodiment of conveyance means of FIG. 7 are so provided that there is a change in the axis of revolution of conveyance belt 141 about said pulleys during its closed path of travel from and to pulley 146 in the amount of at least 180°. By so providing the relative orientation of the axes of the various pulleys, dough pieces received on the outside dough supports of the conveyance belt at the entry location A adjacent pulley 146 will pass around the closed loop path of travel over and under pulleys 148, 150, 152, 154, 153, 151, and 149 such that they will be on the inside of the conveyance belt on their first pass of the underside of pulley 146 and after again traversing the complete path about said other pulleys, will be on the outside of belt 141 when they again reach pulley 146 and the exit location indicated generally at B. This occurs, in that the belt rotates 180° in passing from the entry location indicated generally at A at pulley 146 about the other pulleys before it returns to the other side of the pulley 146 in the location B. Thus a maximum number of dough pieces may be stored upon the dough proofing apparatus, with dough pieces on both sides of the conveyor belt and on adjacent sides of the belt divided by the center drive chain, as they pass twice around the closed loop path from the entry location A to the exit location B.

By way of example, and in further explanation of the foregoing, the path of travel of an exemplary dough support 142 about the pulleys during one revolution of the belt travel will be explained with regard to the schematic representation of FIG. 7. Starting adjacent pulley 146 at the dough piece entry location indicated generally at A, a pair of adjacent outer dough supports 142 and 142' pick up dough pieces and travel upwardly over the top of pulley 148, under pulley 150, as explained in association with the prior description given with regard to FIGS. 8 through 10, over the top of pulley 152, the support means thus far still being on the outside of the associated pulley and the axis of rotation for the belt having been turned 90° counterclockwise, when viewed from above in FIG. 7, as produced by the angular relationship between axle 157 and drive shaft 147. At this point in the dough proofing apparatus, the conveyance belt 141 is given a twist configuration, indicated generally at C, whereby the belt is twisted 90° clockwise when viewed from above to place the dough supports 142 and 142' on the inner side of the belt (relative to the pulley) as it passes beneath pulley 154 upwardly on the other side and through a second 90° twist in a clockwise direction when viewed from above in FIG. 7 to place the support means 142 and 142' on the upper or outer side of the belt relative to pulley 153. The support means then pass beneath pulley 151 and over pulley 149. Thereafter belt 141 is turned another 90°, clockwise, to bring the support means past exit location B on the inner side of the conveyance belt (relative to pulley 146) such that the dough pieces are not discharged, but carried on all the way around the loop once more where, due to a 180° reversal of the belt, they will return on the outside of the conveyance belt as they approach location B and fall by gravity onto the discharge means indicated generally at 200. In summary, and as will be noted from a review of the foregoing, the axis of rotation for the conveyance belt 141 was changed four times over the pulley system with one 90° counterclockwise movement and three 90° clockwise movements to produce a resultant of 180° change in the axis of rotation to reverse the conveyance belt once each time as it goes around the closed path of the pulley system described.

SECOND ALTERNATIVE EXEMPLARY EMBODIMENT

A second alternative exemplary embodiment of dough proofing apparatus, and particularly a pulley and belt arrangement therefor, is illustrated schematically in FIG. 12. It is contemplated that other types of dough pieces, such as the toroid or doughnut, indicated generally at 210 in FIG. 11, could be placed into a proofing mode of closed loop travel about a conveyance belt and pulley system as described in the foregoing embodiment with a somewhat different arrangement of pulleys and the means for mounting them. As seen in FIG. 12, a pair of dough pieces 211 and 212 may be fed upon a dough receiving means, indicated generally at 260, and including divided ramp portions 261 and 262 to be picked up upon a dough conveyance belt 241 constructed as the aforedescribed conveyance belt 141 of the prior embodiment. Dough supports as in either of the prior embodiments may be provided upon the conveyance belt in the arrangement described with regard to the first alternative embodiment, the present belt and pulley system differing from that of FIG. 7 only in the arrangement of the associated pulleys and the consequent changes in the axes of rotation for portions of the conveyance belt 241 as it passes thereabout. Referring to FIG. 12, pulleys 246 and 248 through 251 are rotatably mounted upon supporting shafts 247 and 252 through 255, respectively, as illustrated schematically in the figure. Dough pieces picked up on the conveyor belt 241 will pass around the closed loop path of travel twice before coming around on the exterior of pulley 251 to be dropped by gravity onto the discharge means indicated generally at 300 and including ramp portions 301 and 302. The axis of rotation for the first three pulleys in this system, pulleys 246, 248 and 249, are parallel to one another. However, a 90° clockwise rotation, when viewed from above in FIG. 12, is provided between pulleys 249 and 250 by orienting pulley shaft 254 at right angles to pulley shaft 253. Another 90° clockwise rotation is accomplished through the twist of the conveyance belt 241 from pulley 250 to pulley 251, pulley shaft 255 being at right angles to pulley shaft 254, to provide a completed 180° rotation for the conveyance belt as it returns to pulley 246. Therefore, dough pieces carried upon dough supports on the outer side of pulley 241 will come back after a first travel about the closed path of travel on the inner side past pulleys 251 and 246 to pass around once more before coming out on the outer side of the belt as it comes around pulley 251 to be freely dropped on the discharge means indicated generally at 300.

THIRD ALTERNATIVE EXEMPLARY EMBODIMENT

Figures 13, 16:
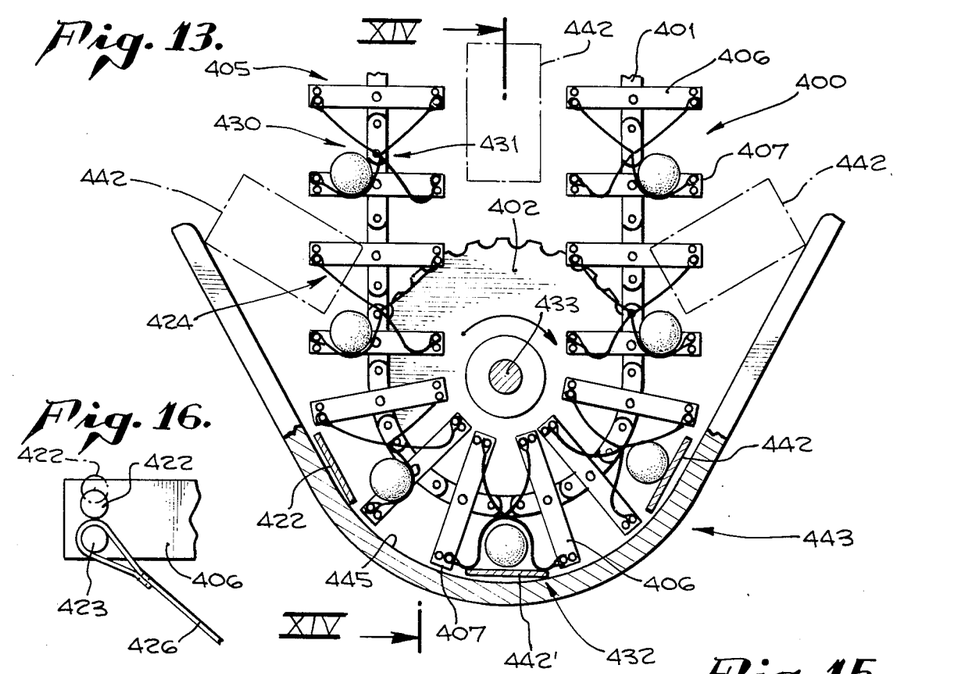
FIG. 13 is a detail view of a portion of an alternative embodiment of conveyance means having alternative embodiments of dough receiving receptacles.
FIG. 16 is a detail view of a portion of the dough receiving receptacles of the embodiment of FIG. 13.
Figure 17:
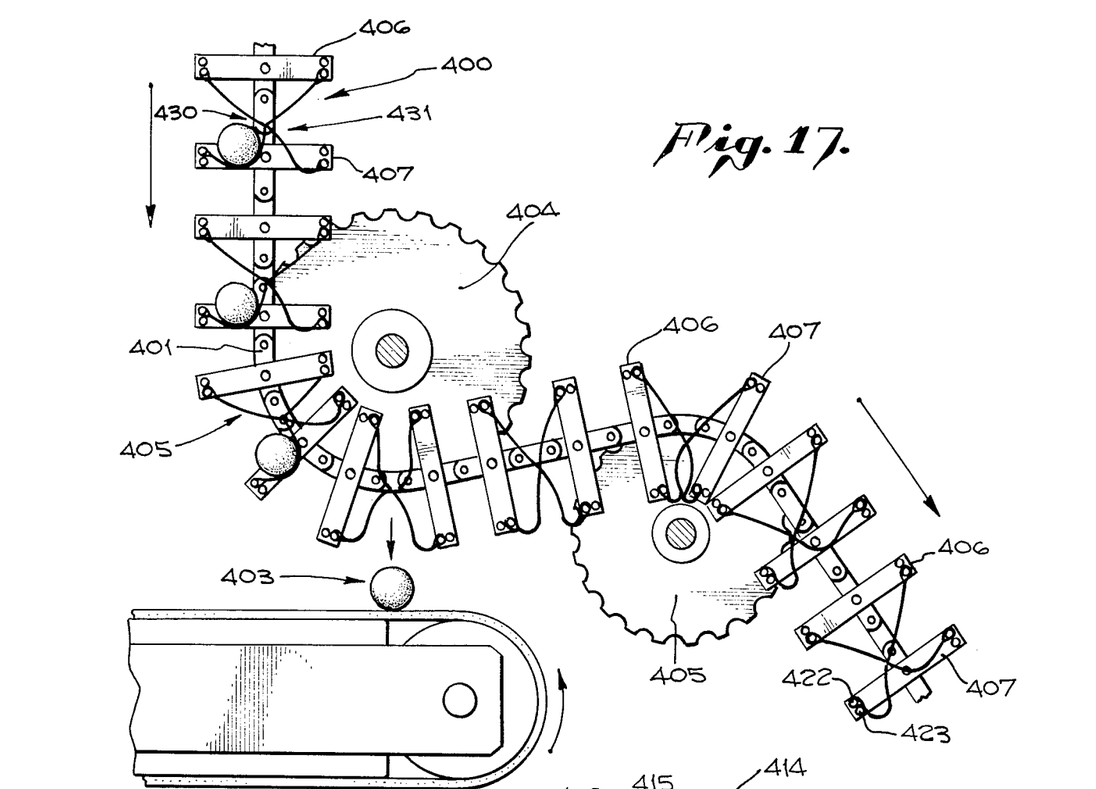
FIG. 17 is a detail view of another portion of the alternative exemplary embodiment of conveyance means of FIGS, 13 through 16.

Another alternative form of dough proofing apparatus is illustrated in FIGS. 13 through 18. Referring firstly to FIGS. 13 and 17, it can be seen that in this alternative exemplary embodiment, the dough conveyance means, indicated generally at 400 includes a chain 401 passing under a pulley 402 in FIG. 13 and through a dough piece release station, indicated generally at 403 in FIG. 17 beneath pulley 404. It should be understood by those skilled in the art that chain 401 may pass about a plurality of pulleys as in the foregoing exemplary embodiments, the showing of FIG. 17 illustrating a continuation of the chain over a next adjacent pulley 405 as it travels about a closed loop path, preferably with a 180° twist therein, as explained hereinbefore. As is particularly contemplated within the present invention, the extended path of travel maintains the dough pieces on the chain for a longer period of time, for a given length of loop, and also, as considered within the present invention, the dough support means are provided in order to support four dough pieces in generally adjacent location at any given section of the belt.

Figure 18:
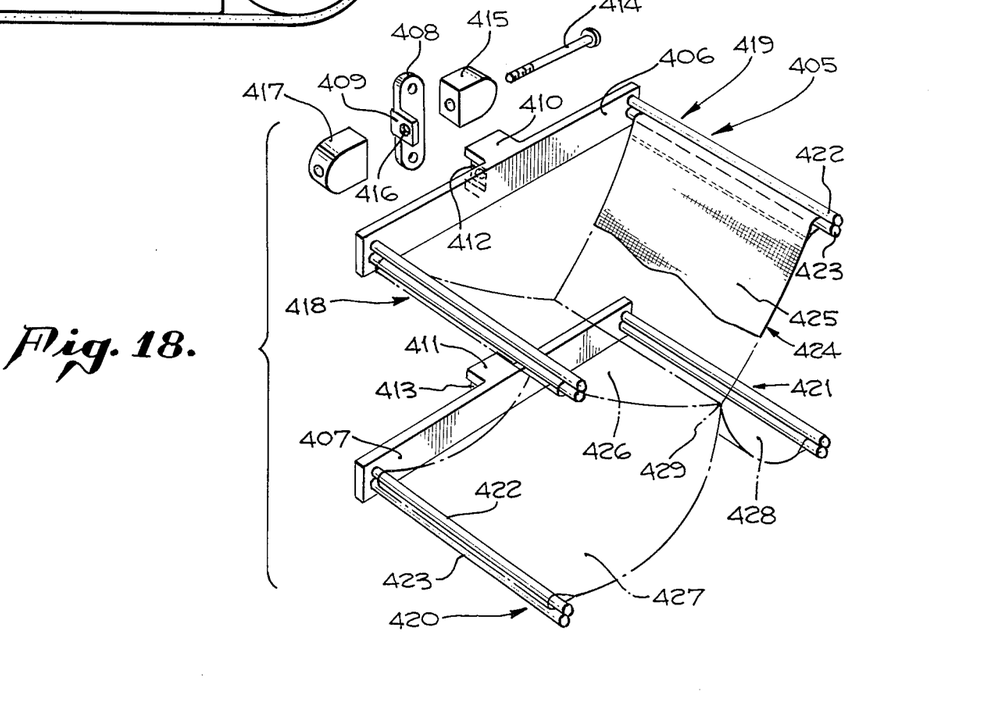
FIG. 18 is a detail view of the exemplary embodiment of dough receiving receptacle of FIGS. 13 through 17.

As seen in the exploded view of FIG. 18, each of the dough support means, indicated generally at 405, includes a pair of frame members 406 and 407, respectively, which are adapted to be secured in spaced relation to the chain 401. Special chain links 408 may be provided with apertured angle extensions 409 as seen in FIG. 18. Each of the frame members 406 and 407 may in turn be provided with a base portion 410, and 411, having mating slots 412 and 413, respectively, to receive the angle arm 409 of an associated special chain link 408. Each base member may be provided with a bore therethrough so that the mated angle arm and frame member base may be secured together by passing a conventional threaded fastener 414 through spacing block 415, through the aperture 416 in angle arm 409 and into the bored and tapped anchor block 417. As can be seen from the foregoing, and as seen in FIGS. 13 and 17, a plurality of pairs of spaced frame members 406 and 407 may be thereby mounted on opposite sides of the chain 401 in a continuous array therealong. The side by side mounting of such pairs of frame members is also seen in FIG. 14 with adjacent frame members 407 and 407' being mounted to the chain 401 being driven about sprocket or pulley 402.

Each of the frame members 406 and 407 is provided with a pair of laterally extending, spaced arm means 418, 419, 420 and 421 as seen in FIG. 18. Each of said arm means comprises a pair of adjacent, resilient rods 422 and 423, as seen in FIG. 16, which tend to resiliently trap and retain a fabric material intersposed between them.

In the exemplary embodiment of FIGS. 13 through 18, the support means indicated generally at 405 also includes a flexible fabric-like pocket forming webbing, indicated generally at 424, which is suspended between the arms as best seen in FIG. 18. More particularly, the dough piece supporting webbing, indicated generally at 424, comprises four flexible fabric-like webs 425, 426, 427 and 428 which have a common central intersection or junction 429. Each of said webs is also provided at its outer end with a turned back and sewn portion to provide a loop, as seen in FIGS. 16 and 18, which is sized to fit over one of the rods 423 and be resiliently retained between the adjacent rods 422 and 423 of the associated frame member arm means. The flexible fabric like webs thus provide a pair of opposed, flexible pockets as indicated at 430 and 431 as seen in FIGS. 13 and 17.

Figures 14, 15:
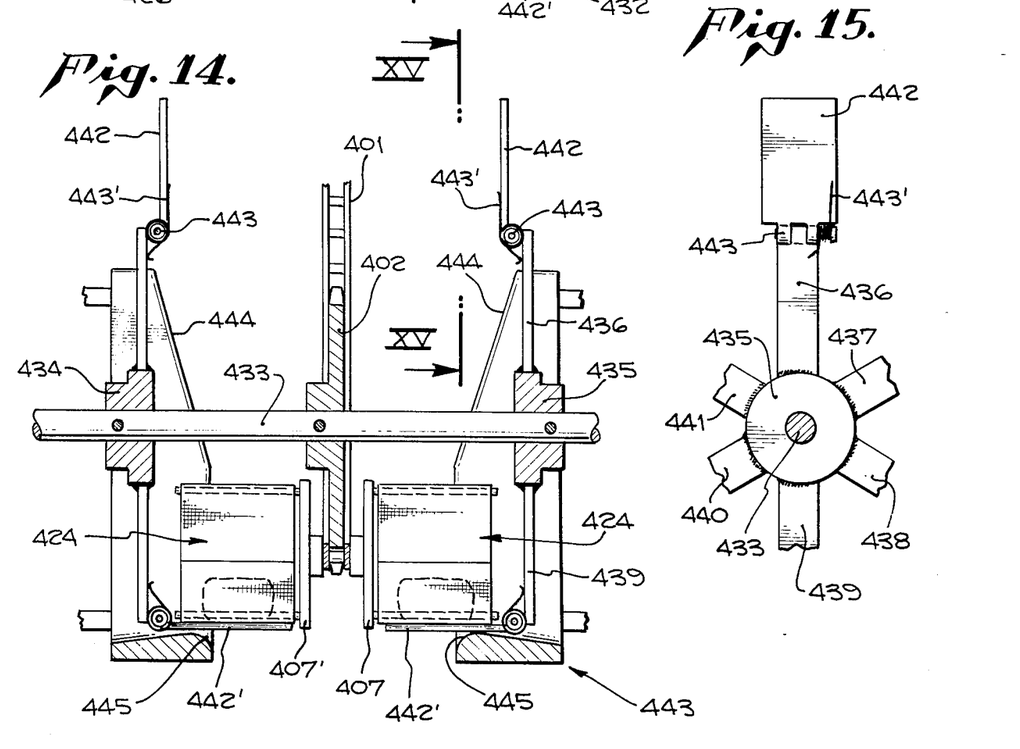
FIG. 14 is a section view taken in FIG. 13 along the plane XIV—XIV.
FIG. 15 is a detail view taken in FIG. 14 along the plane XV—XV.

Referring now to FIGS. 13 and 14, means are provided in the present alternative exemplary embodiment in association with at least one or more of the pulleys for providing additional support to a dough piece as its support means passes beneath the pulley. As seen in FIG. 13, the dough pocket, as pocket 430, of each dough support means, indicated generally at 405, moves into an inverted position, as seen at 432, as it passes beneath the pulley 402 such that the associated dough piece would be dropped from the conveyance means. The means for providing additional support comprises the provision of a plurality of pivotally mounted support plates which are moved in unison with rotation of pulley 402 and are moved by associated guide means into an underlying, additionally supporting position as will now be explained.

As seen in FIG. 14, pulley 402 is supported on a pulley shaft 433. A pair of hub members 434 and 435 are also mounted and pinned to shaft 433 for concurrent rotation therewith. Each hub member 434, 435, as seen in FIG. 15, is provided with a plurality of radially outwardly extending arms 436 through 441. Each of said arms is provided at its outer extremity with a support plate 442 which is pivotally mounted thereto at 443 and biased by spring 443' into a generally parallel radially extending position as seen in FIGS. 14 and 15. Camming means are provided for camming each of the support plates 442 into a laterally extending position, underlying a dough piece, as illustrated by the position of plate 442' in FIGS. 13 and 14. It should be understood that such additional support means and cam means are provided on opposite sides of the sprocket or pulley 402, in symmetrical manner, although only one side thereof is being explained in detail. The exemplary camming means is indicated generally at 443 and includes a first camming surface 444 against which each of the plates 442 rides to be pivoted into its lateral position with the interior cam surface 445 being provided in the area beneath the sprocket or pulley 402 in order to maintain each support pleat 442 in an underlying additionally supportative relationship to a dough piece which would otherwise be dropped from the associated dough supporting means as it passes beneath the pulley or sprocket.

It has been found that the flexible web fabric-like dough supports of the present embodiment allow for the support of a greater number of dough bodies for a given length of conveyance belt than heretofore attainable by the conventional pivotally mounted supports which require a full circle swinging motion to support a dough body during transverse about the closed loop path. The frame members of the present embodiment of dough supports are fixed, rather than pivotally mounted, to the conveyance belt. This allows for a spacing of as little as about three and three quarters inches between supports on the belt in the present embodiment as compared to about six inches or more for the pivoting type support.

FOURTH ALTERNATIVE EXEMPLARY EMBODIMENT

Figures 19, 20, 21:
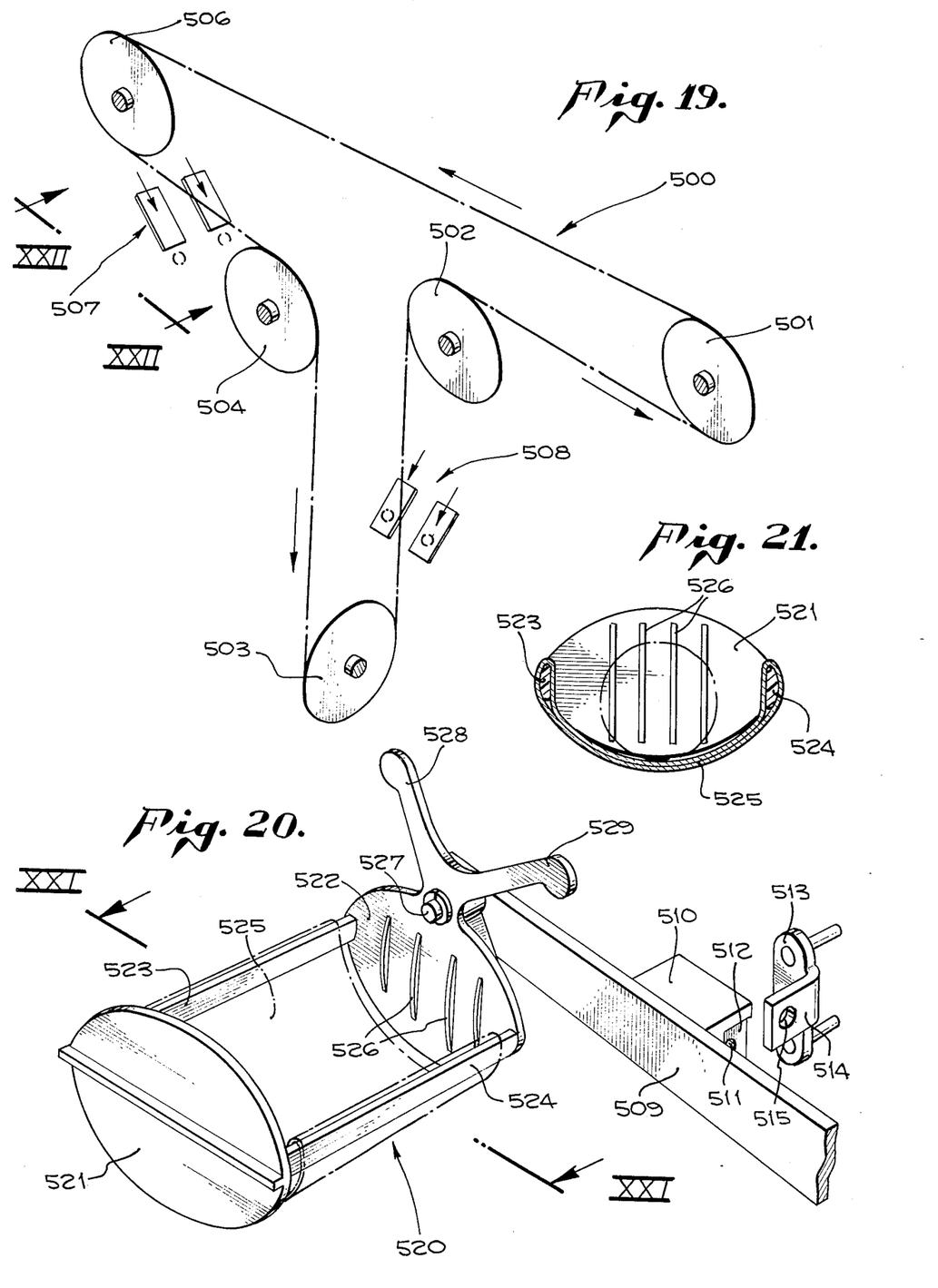
FIG. 19 is another alternative exemplary embodiment, shown somewhat schematically, of dough proofing apparatus according to the present invention showing a different relative arrangement of pulley axis of the conveyance means.
FIG. 20 is a detail view of a portion of an alternative dough receiving receptacle means showing one of the receptacles in perspective.
FIG. 21 is a section view of the dough receiving receptacle of FIG. 20 taken therein along the plane XXI—XXI.

Another alternative exemplary embodiment of dough proofing apparatus, according to the present invention, is illustrated in FIGS. 19 through 23 in which an alternative embodiment of dough piece supporting means is illustrated. Referring first to FIG. 19, the dough conveyance means is shown somewhat schematically with a chain or belt 500 being run about a plurality of pulleys or sprockets 501 through 506. The arrangement of pulleys and chain of the foregoing embodiment may comprise a similar arrangement, the discharge station of FIG. 17 being somewhat schematically represented in FIG. 19 generally at 507. The entry area for the conveyance means is indicated somewhat schematically at 508. It should be understood by those skilled in the art that the overall arrangement of conveyance belt and pulley means here illustrated, while being somewhat different than those heretofore described, is similar in having a continuous closed loop path having at least a 180° twist in the belt travel in order to provide for two generally complete revolutions of the belt for each dough piece between its entry station and exit station. The present alternative exemplary embodiment is intended primarily to illustrate an alternative form of dough support means, and its manner of attachment to the conveyance means belt or chain as illustrated in FIGS. 20 through 23.

Figures 22, 23:
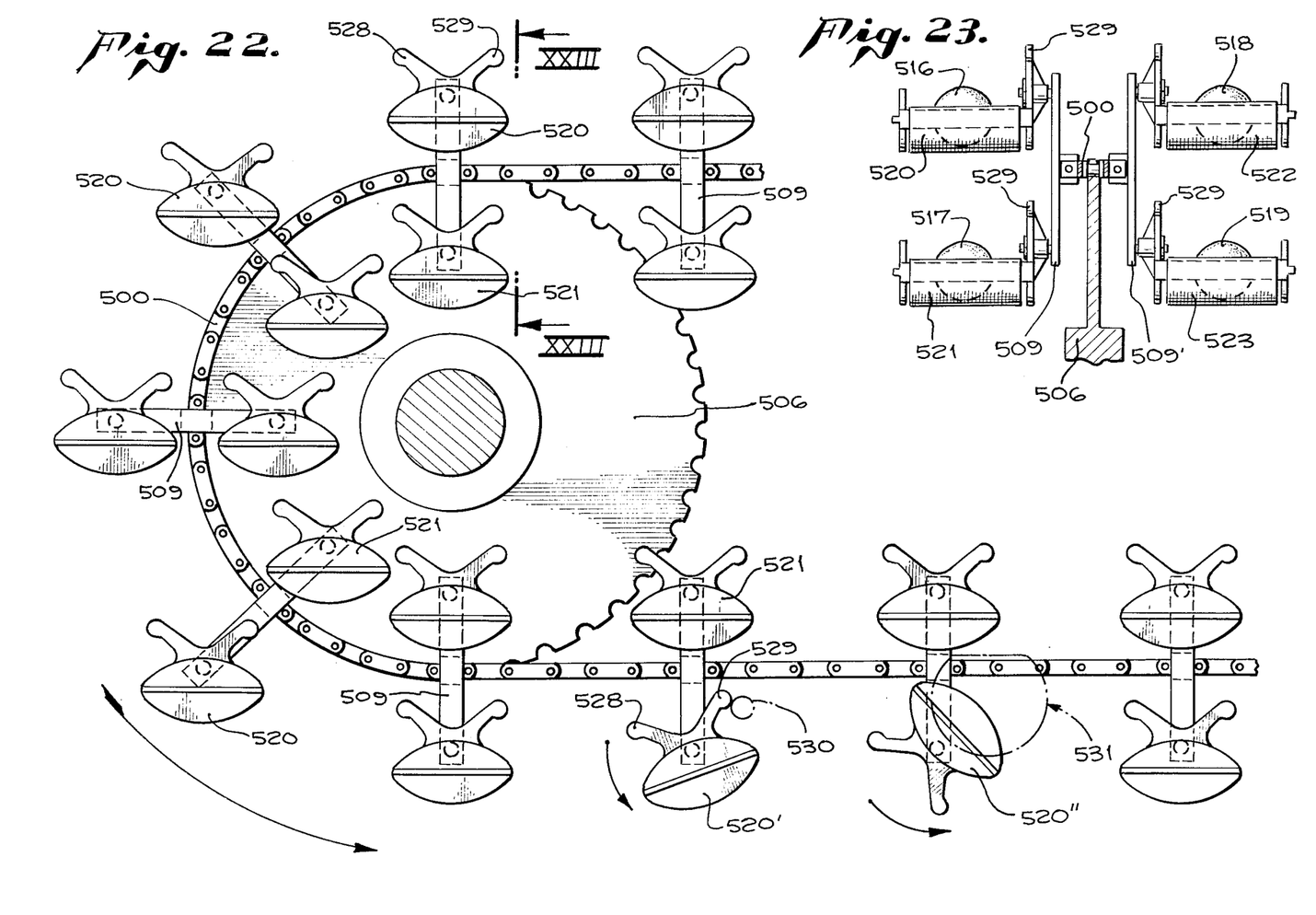
FIG. 22 is a detail view of a portion of the alternative exemplary embodiment of dough conveyance means of FIG. 19 showing the orientation of a plurality of dough receiving receptacle means of FIGS. 20 and 21 as they pass about one of the conveyance means pulleys.
FIG. 23 is a side elevational view, partially in section, of a dough receiving receptacle means of FIG. 22 taken therein along the plane XXIII—XXIII.

As seen in FIG. 20, the present alternative exemplary embodiment of dough piece support means includes the provision of at least one frame member 509 having a base 510 provided with a cross bore 511 and slot 512 as previously described with regard to frame members 406 and 407 of the embodiment of FIG. 18. As before, a special chain link 513 may be fitted into the chain which is provided with an angle arm 514 having an aperture 515, the arm and aperture being provided to mate with slot and aperture 512 and 511 respectively. Each such frame member 509 may be mounted to the chain through the use of appropriate fastener means, spacer blocks and anchor blocks as described with regard to members 414, 415 and 417 of the embodiment of FIG. 18. As seen in FIG. 23, such frame members 509 may be mounted to chain 500 in adjacent relation on opposite sides of the chain as indicated by members 509 and 509' in FIG. 23.

A pair of dough receiving receptacles are pivotally mounted to and laterally extend from each of the frame members 509 so that a pair of laterally adjacent support means on said belt, as seen in FIG. 23, present four dough piece receiving pockets at a given location on the belt or chain 500. Four dough pieces, 516 through 519 are shown in FIG. 23 supported in pockets provided by four receptacles 520 through 523 respectively. Thereby, the efficiency of the proofing apparatus is greatly increased in having four dough pieces supported at a given location on the belt and also in running the belt or chain about the pulleys in a substantially double travel about the closed loop of the belt or chain travel about the pulleys as hereinbefore described.

Referring now to FIG. 20, each of the dough piece receiving receptacles, as receptacle 520 in FIG. 20, may be formed of a plastic frame member including end plates 521 and 522 with joining arms 523 and 524. A fabric-like web 525 is provided with looped ends fitted over the arms 523 and 524, respectively, in order to provide a flexible support pocket for a dough piece to be received therein. As seen on end plate 522, arcuate projections, as projection 526, may be provided to keep a dough piece from engaging the otherwise flat surface area of an end wall to reduce any tendency of the dough piece to stick or adhere thereto. End plate 522 is pivotally mounted upon a journal post 527 secured to and extending laterally of the frame member 509. Therefore, as the plurality of receptacles, pivotally supported on each of their frame members 509, are run about the various pulleys on the chain or belt 500, as seen in FIG. 22, they will continuously tend to remain in an upright position since the center of gravity of the dough piece and receptacle is positioned below the pivotal axis of the receptacle on journal post 527.

In order to discharge a dough piece from the conveyance means of the alternative exemplary embodiment of FIG. 19 through 23, each receptacle may be provided with a pair of ear-like projections 528 and 529, as seen in FIG. 20, which may be used to tilt or swing the receptacle into an inverted position where desired to drop the associated dough piece at a release station. As seen in FIG. 22, such a stop is indicated at 530 by a stop pin or bar which extends into the path of travel of the receptacle projection 529 of the receptacles on a forward side of the chain when viewed in the position of FIG. 22. It should be understood that receptacles facing in the opposite direction in FIg. 22 would have their associated projection 528 interfering with a stop member in similar manner. Through the use of such a stop, indicated at 530, a given receptacle, as 520' in FIG. 22, may be swung into an inverted position as indicated by the receptacle 520'', the receptacle then assuming its upright orientation thereafter to continue into other areas of the conveyance means where other dough pieces may be dropped onto the receptacle for a proofing operation. To assist the complete turnover of the receptacle 520' and to assure the release of the dough piece carried thereby, a generally circular cam member, indicated somewhat schematically at 531, may also be provided in the path of travel of an inverted receptacle such that its fabric-like webbing 525 will be deflected as the receptacle passes under camming member 531 to assure release of the associated dough piece.

Having thus described a preferred and four alternative exemplary embodiments of the dough proofing apparatus for use in association with a dough forming apparatus according to the present invention, it should be understood by those skilled in the art that various modifications and alternative embodiments thereof can be made which come within the scope of the present invention which is defined by and limited only by the following claims.

We claim:

1. A dough proofing apparatus for use in association with a dough forming apparatus having a dough piece receiving means for directing a received dough piece toward a dough forming means thereof for shaping said piece into a desired configuration, said proofing apparatus comprising:

dough conveyance means for receiving and coveying dough pieces in a closed loop path of travel between entry and exit locations;

means for mounting said dough conveyance means relative to said dough forming apparatus to place said conveyance entry and exit locations interposed between said dough piece receiving means and said dough forming means, whereby dough pieces leaving said dough piece receiving means are conveyed by said conveyance means to said dough forming means indirectly via said closed loop path to allow for proofing thereof prior to said pieces being shaped by said forming apparatus, wherein said dough conveyance means comprises:

a plurality of vertically spaced pulleys with a conveyance belt run thereabout in a closed loop path of travel and means for mounting said pulleys relative to each other such that said belt turns through a resultant change of its axis of rotation of 180° in a given direction on each complete revolution thereof about said pulleys whereby dough pieces received on said dough support means at said receiving location travel more than one complete revolution around said pulleys on said conveyance belt before reaching said delivery location.

2. A dough proofing apparatus as in claim 1 wherein: dough support means are provided on both sides of said belt and each comprises a base on said belt with a main portion laterally extending from said belt with cross end members whereby adjacent supports trap a dough piece therebetween during normal travel between pulleys but release the same when traveling under a pulley on the outside of said belt.

3. A dough proofing apparatus as in claim 1 wherein: dough support means are provided on both sides of said belt and each comprises two dough receiving receptacles to provide for supporting four dough pieces at a time on each pair of adjacent support means.

4. A dough proofing apparatus as in claim 3 wherein each said dough support means comprises:

a pair of frame members supported in spaced relation on said belt, each said frame member having a pair of laterally extending spaced arms means to provide four such arms means in a generally rectangular array and extending laterally of said belt; and four flexible fabric-like webs having a common central intersection at inner ends thereof and means at outer ends thereof for joining each said web to an associated arm of said frame members to provide four outwardly facing dough piece receiving pockets.

5. A dough proofing apparatus as in claim 4 wherein: means are provided in association with at least one of said pulleys beneath which said conveyance belt passes to provide additional support to said dough pieces that may be in pockets of said dough piece receiving pockets which are oriented in an inverted position as the associated dough support means pass under said pulley on said belt as the latter runs in its closed loop path.

6. A dough proofing apparatus as in claim 3 wherein each said dough support means comprises:

a frame member secured to said belt, and a pair of dough receiving receptacles pivotally mounted to and laterally extending from said frame member, whereby a pair of laterally adjacent support means on said belt present four dough piece receiving pockets at a given location on said belt.

7. A dough proofing apparatus for receiving and conveying dough pieces from a dough receiving location to a dough delivery location comprising:
a dough conveyance belt and a plurality of pulleys over which said belt rides;
dough support means on said conveyance belt for receiving and retaining dough pieces thereon as said belt travels from said dough receiving location to said dough delivery location; and
means for mounting said pulleys relative to each other such that said belt turns through a resultant change of its axis of rotation of 180° in a given direction on each complete revolution thereof about said pulleys whereby dough pieces received on said dough support means at said receiving location travel more than one complete revolution around said pulleys on said conveyance belt before reaching said delivery location.

8. The dough proofing apparatus of claim 7 wherein said dough support means comprises:
a plurality of frame members secured along said belt on both sides thereof, and
dough piece receptacle means secured to said frame members for supporting a plurality of dough pieces thereon.

9. The dough proofing apparatus of claim 8 wherein:
said frame members are provided in sets of two spaced members, each having laterally extending arm means; and
said receptacles comprise fabric-like flexible web means including four web portions, inner ends of said portions having a common intersection and outer ends thereof secured to an associated arm means of said frame members to provide dough piece receiving pockets of flexible configuration.

10. The dough proofing apparatus of claim 8 wherein:
said frame members are each provided with a pair of spaced journal post means; and
said receptacles comprise a rectilinear body pivotally mounted to a post means of said frame members and webbing means secured to said body to provide a dough piece receiving pocket.

11. The dough proofing apparatus of claim 7 wherein:
said dough support means are provided in pairs of dough receptacle means in generally adjacent relation but on opposite sides of said belt, and
each of said receptacle means provides at least two dough piece receiving pockets, whereby at least four dough pieces may be supported from a given location on said belt.

12. The dough proofing apparatus of claim 7 wherein:
means are provided for maintaining a dough piece in its associated receptacle during travel of such receptacle about said more than one complete revolution around said pulleys, and
means are provided for positively releasing dough pieces from said receptacles when they reach said delivery location.

13. In a dough handling apparatus including dough supports mounted to a conveyance chain, the improvement in dough support comprising the provision of:
a pair of frame members supported in spaced relation on said chain, each said frame member having a pair of laterally extending spaced arms means to provide four such arms means in a generally rectangular array and extending laterally of said chain; and
four flexible fabric-like webs having a common central intersection at inner ends thereof and means at outer ends thereof for joining each said web to an associated arm of said frame members to provide four outwardly facing dough piece receiving pockets.

14. The dough proofing apparatus of claim 7 wherein said dough support means are provided on each of two sides of said conveyance belt for receiving and retaining dough pieces on both sides thereof as said belt travels around said pulleys.

* * * * *